Aug. 20, 1929.　　　　A. BLOCH　　　　1,725,050
OIL GAUGE
Filed July 17, 1926
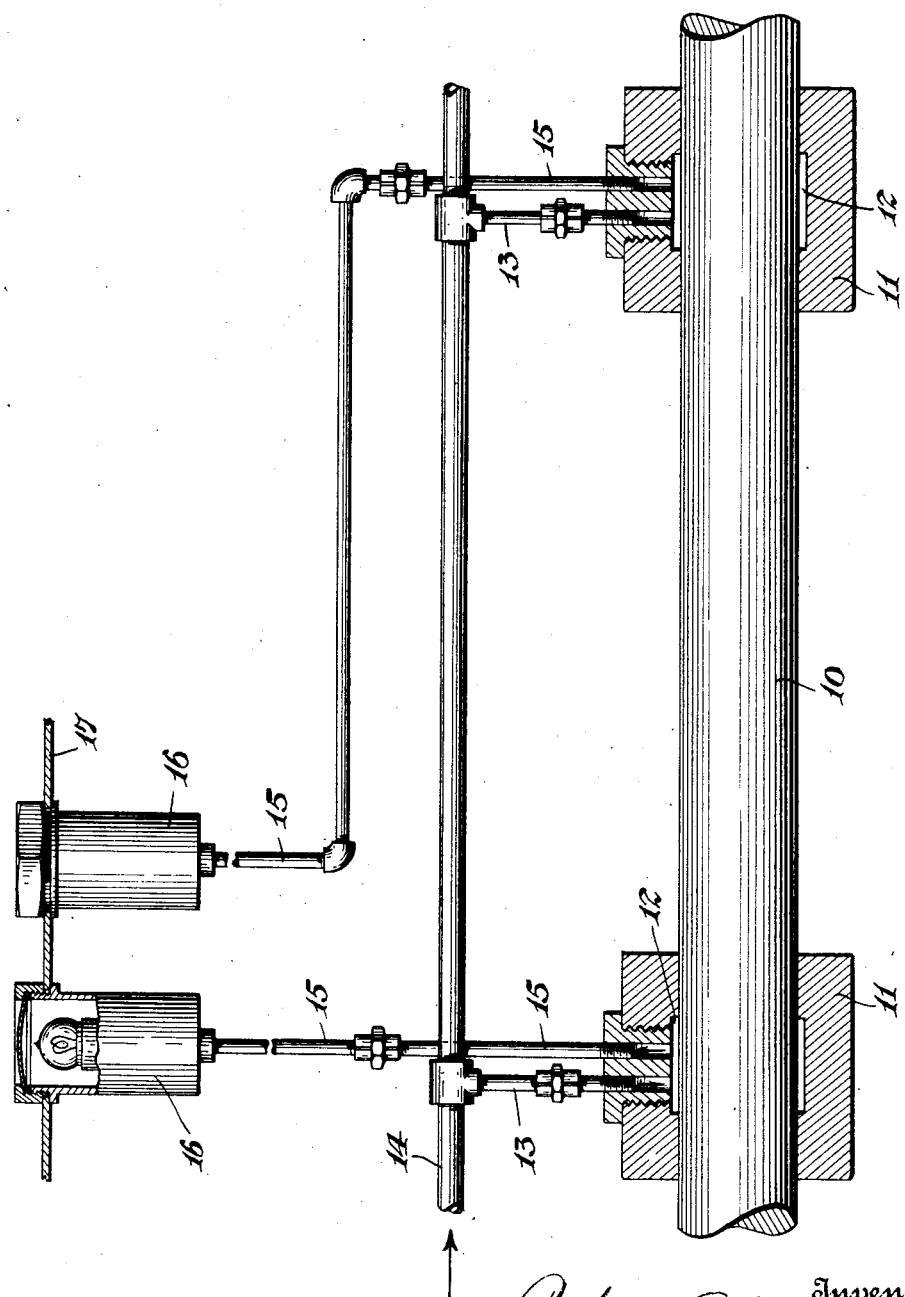

Patented Aug. 20, 1929.

1,725,050

UNITED STATES PATENT OFFICE.

ARTHUR BLOCH, OF PHILADELPHIA, PENNSYLVANIA.

OIL GAUGE.

Application filed July 17, 1926. Serial No. 123,098.

This invention has for its objects the provision of a simple and reliable system for ascertaining whether the proper pressure of oil is being maintained in each bearing of a multiple bearing machine such as a large prime mover.

The invention involves the use of an individual pressure signal for each bearing of the machine, the signal being connected to its bearing in such a manner that any reduction of oil pressure at the bearing will cause the signal to operate to give an alarm.

While a preferred embodiment of the invention has been disclosed for purposes of illustration, it should be understood that various changes may be made without departing from the spirit of the invention as hereinafter set forth and claimed.

In the drawing, the single figure is a plan view partly in section of the signal system.

Referring to the drawing more specifically, the numeral 10 refers to the revolving shaft of the machine and 11 indicates the bearings in which the shaft is journaled. Each of the bearings is provided with an oil chamber 12 surrounding the shaft and fed by a pipe 13 from an oil pressure line 14. A signal pipe 15 leads from the oil chamber 12 to the oil signal 16, which may be of any suitable type, preferably of the kind disclosed in my Patent No. 1,573,371, granted on Feb. 16, 1926.

A similar signal is connected to each one of the bearings and the signals are mounted together upon a panel as shown at 17. When the machine is in operation oil is pumped through lines 14 and 13 to maintain the desired working oil pressure in chambers 12. This pressure will be communicated through lines 15 to the signals 16, which will show by a visual signal the fact that the proper pressure is being maintained in each of the oil chambers 12. Should any one of the feed lines 13 become clogged, or if for any other reason the proper pressure is not maintained in one of the oil chambers, the signal connected to that chamber will immediately flash a warning.

It should be noted that this system provides a separate signal for indicating the pressure conditions at each bearing, and is much more efficient than a system in which a single signal is used to indicate pressure conditions in the main feed line. The present improved system will give immediate indication of local troubles which would continue unnoticed with previous signal systems until the oil failure had caused considerable injury to the machine.

I claim:—

1. The combination with a shaft; of a bearing having an oil chamber in its interior surrounding the shaft, an oil feed pipe communicating with the bearing chamber, a gauge pipe communicating with said chamber at a point in spaced relation to the feed pipe communication, and a gauge on said gauge pipe.

2. In combination, a bearing having an annular recess extending around its bore intermediate its ends to form an oil chamber, said bearing having a pair of spaced ports communicating with said chamber, an oil feed pipe connected to one of said ports, a gauge pipe connected to the other port, and a gauge carried by said gauge pipe.

In testimony whereof I affix my signature.

ARTHUR BLOCH.